United States Patent Office 2,776,946
Patented Jan. 8, 1957

2,776,946

COMPOSITIONS COMPRISING PLASTICIZED ACRYLONITRILE POLYMERS AND MOLDED AND EXTRUDED ARTICLES MADE THEREFROM

Marion R. Lytton, West Chester, Edward A. Wielicki, Philadelphia, and Ellis Lewis, Jenkintown, Pa., assignors to American Viscose Corporation, Philadelphia, Pa., a corporation of Delaware No Drawing. Application February 23, 1952,
Serial No. 273,144

4 Claims. (Cl. 260—32.6)

This invention relates to new compositions of matter comprising polymeric materials containing at least 85% by weight of polymerized acrylonitrile, and plasticizers therefor.

Polyacrylonitrile and acrylonitrile copolymers containing 85% or more of polymerized acrylonitrile cannot be molded under heat and pressure to form colorless, flexible articles having high tensile strength. These polymeric materials have decomposition temperatures below their fusion temperatures and when it is attempted to produce molded articles therefrom by fusing the polymers under pressure, they undergo thermal decomposition and molecular rearrangement which result in a pronounced discoloration. Articles obtained by molding the polymers under heat and pressure are highly discolored, brittle and weak.

It is an object of this invention to provide compositions comprising plasticized polymeric materials containing at least 85% by weight of polymerized acrylonitrile which are fusible without decomposition and can be molded under pressure at temperatures below the decomposition and discoloration temperature of the polymeric material. A further object is to provide molded articles comprising the polymeric materials which are substantially free of discoloration. Other objects and advantages will appear hereinafter.

In accordance with the present invention, it has been found that certain aliphatic and heterocyclic nitrosamines are compatible with the polymeric materials containing at least 85% by weight of polymerized acrylonitrile and and when mixed therewith serve as plasticizers therefor which, in effect, reduce the fusion temperature of the polymeric materials to below the decomposition temperature thereof, thus making it possible to mold the mixture under pressure at temperatures at which the polymeric material is not decomposed. The molded articles formed from the new compositions are clear, substantially colorless and flexible, and have excellent tensile strength.

The aliphatic nitrosamines which are useful are the dialkyl nitrosamines in which the alkyl radicals contain from 1 to 3 carbon atoms and may be the same or different, and cyanoalkyl nitrosamines, alkyl-cyanoalkyl nitrosamines and bis (cyanoalkyl) nitrosamines in which the alkyl radicals are methyl or ethyl. This includes methyl-B-cyanoethyl nitrosamine, cyanomethyl and cyanoethyl-nitrosamines, and bis (cyanomethyl)- and bis (B-cyanoethyl)-nitrosamines.

The useful heterocyclic nitrosamines are those containing a single 5- or 6-membered heterocyclic ring of which the nitrogen atom attached to the NO— group is a member, including nitrosopyrrolidine, nitrosomorpholine, nitrosopiperidine, mono-nitroso-piperazine, and such heterocyclic nitrosamines having alkyl groups each containing a total of not more than three carbon atoms attached to the heterocyclic nucleus, such as mono-nitroso-2,5-dimethylpiperazine.

Mixtures of the nitrosamines may be used. In all of these plasticizing materials, the N—NO group is the "functional" group so far as plasticizing of the acrylonitrile polymers is concerned.

The polymeric material to be plasticized may be polyacrylonitrile, or copolymers of acrylonitrile containing, by weight in the molecule, at least 85% acrylonitrile with at least one other monoethylenically unsaturated monomer which is copolymerizable with acrylonitrile. Monomers which may be copolymerized or interpolymerized with acrylonitrile to produce binary or ternary acrylonitrile copolymers include acrylic, alpha-chloracrylic and methacrylic acids; methyl methacrylate, ethyl methacrylate, butyl methacrylate, octyl methacrylate; 2-nitro-2-methylpropyl methacrylate, methoxymethyl methacrylate, B-chlorethyl methacrylate and the corresponding esters of acrylic and alpha-chloracrylic acids; vinyl chloride, vinyl fluoride, vinyl bromide; vinylidene chloride, 1-chloro-1-bromo-ethylene, vinylidene bromide, 1-fluoro-1-chloro-ethylene, 1,1-difluoroethylene; methacrylonitrile, α-chloroacrylonitrile; acrylamide, methacrylamide, N-dimethylacrylamide, alpha-chloroacrylamide, or monoalkyl substitution products thereof; methyl vinyl ketone and methyl isopropenyl ketone; vinyl carboxylates such as vinyl acetate, vinyl chloracetate, vinyl propionate and vinyl stearate; N-vinylimides such as N-vinyl phthalimide and N-vinylsuccinimide; methylenemalonic esters; itaconic acid and itaconic esters; trifluorochloroethylene; N-vinyl carbazole; vinylpyridines including those having hydrocarbon groups attached to the pyridine ring, for example 2-vinylpyridine, 5-vinyl-2-methyl pyridine, 2-vinyl-5-methylpyridine, etc.; vinylimidazoles including those having hydrocarbon groups attached to the imidazole ring, for example 1-vinylimidazole, N-vinylimidazole, 1-vinyl-2-methylimidazole etc., vinyl furane; butyl vinyl sulfone, ethyl vinyl sulfone; ethylene, propylene, isobutylene, butene-1 and butene-2; alkyl vinyl ethers; vinylsulfonic acid; ethylene-alpha,beta-dicarboxylic acids or their anhydrides or derivatives such as diethyl fumarate, diethyl maletate, diethyl citraconate, diethyl mesaconate; styrene, vinyl-naphthalene and the like. Preferred specific terpolymers obtained by interpolymerizing acrylonitrile and two of the other monomers listed herein are the terpolymers of acrylonitrile and a vinylpyridine with methacrylonitrile or vinyl acetate, such as those containing from 90 to 98% acrylonitrile, from 2 to 6% vinylpyridine, and from 2 to 6% vinyl acetate. In preparing the terpolymers, two comonomers are selected which are copolymerizable with acrylonitrile. The third monomer may favorably influence the properties of the terpolymer, for example the plasticity or dyeing capacity, or both. Or the polymeric material may be a blend of a base acrylonitrile polymer, for instance polyacrylonitrile or a binary copolymer of 90 to 98% acrylonitrile and 2 to 10% of another monomer copolymerizable with acrylonitrile such as vinyl chloride or vinyl acetate with a blending acrylonitrile copolymer, for example, a binary copolymer of 10 to 70% acrylonitrile and 30 to 90% of a vinyl-substituted heterocyclic tertiary amine in which the tertiary nitrogen atom is a member of the heterocyclic nucleus, such as a vinylpyridine, in which the overall content of the vinylpyridine is from 2 to 10% on the weight of the blend.

The term "polymeric material containing at least 85% by weight of polymerized acrylonitrile" as used herein includes the homopolymer polyacrylonitrile, binary and ternary copolymers containing at least 85% acrylonitrile, and blends as described.

It has been found that to plasticize the polymeric material, effectively, the nitrosamine should be present in the composition in a minimum amount of 10% by weight based on the combined weight of the polymeric material and nitrosamine. The permissible maximum proportion will depend on the particular nitrosamine and the limit of its compatibility with the polymeric material as indicated by exudation of the plasticizer from the molded article, as well as upon the temperature and pressure of molding. In general, the composition may contain from 10% to 25% by weight of the nitrosamine and the composition may be molded at temperatures between 90 and about 160° C. and pressures between a minimum pressure of 2000 lbs./sq. in. and a maximum of 6000 lbs./sq. in. Specific temperatures and pressures within these ranges may be preferred for specific compositions. In some instances, amounts of the nitrosamine approaching the upper limit of 25% by weight result in molded articles having elastic properties similar to those of molded rubber articles and which are desirable for certain purposes.

The nitrosamine may be uniformly distributed through the finely divided or powdered polymeric material using any conventional mixing device. The ingredients may be mixed in a Banbury mixer or on milling rollers.

Most of the nitrosamines used in practicing the invention are liquids but the mixture comprising 10 to 25% by weight of the nitrosamine is sufficiently dry for easy handling. It may be preliminarily molded into pellets under suitable heat and pressure, if desired. Temperatures of about 100° C. to 150° C. are generally useful at this stage. The composition may be in the pellet form or in loose powder form when it is introduced into the mold in which it is to be given its final shape. The mixtures are stable and exhibit good flow characteristics at the extrusion or molding temperature.

Molded massive objects of diverse shape and adapted to varying uses may be obtained by molding the compositions by injection, or compression molding procedures. Other molding adjuvants, such as mold lubricants, pigments, fillers etc. may be mixed with the molding composition, if desired.

The new plasticized compositions may also be dissolved in a common solvent for the polymeric material and nitrosamine, such as dimethylformamide, dimethylacetamide or sulfolane, and the solutions may be extruded to form filaments or threads, films, tapes, ribbons, etc. The solutions may also be used to provide a protective coating of the plasticized polymeric material to paper, cloth, wire, wood, and metal sheets, and particularly to a substrate comprising a hydrophilic cellulosic material, e. g., cellophane or non-fibrous pellicles of cellulose ethers which are insoluble in water but swollen thereby, and in these applications the solution may be cast to a film and the pre-formed film may then be applied to the substrate with the aid of heat and pressure, or the solution may be applied directly to the substrate the solvent being thereafter evaporated.

The solutions of the compositions are also useful as adhesives for lamination of similar to similar surfaces, e. g., paper to paper, cellophane to cellophane, cloth to cloth, glass to glass, etc., and of dissimilar surfaces to each other, e. g., paper to cloth, cloth to wood, etc.

Also, the compositions may be heated to obtain a hot melt which may be extruded to form filaments or unsupported films, or to provide a suitable substrate with a coating or film. Thus, the intimate mixture of the polymeric material and nitrosamine may be melted in a heated cylinder or the like and pumped through a spinneret or it may be fed into a conventional screw mixer-extruder and extruded as a cylindrical rod which is broken into small pieces and fed into a screw extruder in which it is melted and forced through a spinneret to form filaments.

The nitrosamines are soluble in common hydrocarbons, alcohols and ethers and may be removed from the filaments or yarns by treating them with solvents of the classes mentioned.

Articles obtained by molding the plasticized compositions comprising the polymerized acrylonitrile and nitrosamines are characterized by a Rockwell hardness below M–100 which is considerably below the Rockwell hardness of the brittle articles obtained by molding the unplasticized polymeric material.

In the following examples in which the parts given are by weight, the invention is illustrated by the compression molding of cylindrical rods although it is to be understood that the compositions find general use for molding or extruding numerous other products. The Rockwell hardness of the rods described in the examples was measured by means of the well-known Rockwell Tester.

*Example I*

Ninety parts of powdered polyacrylonitrile having a specific viscosity of $N_{sp}$ 0.25 and an incipient softening temperature of 155° C. were mixed with 10 parts of bis (B-cyanoethyl) nitrosamine and weighed portions of the mixture were placed in cylindrical compression molds having a diameter of 1.25 inch. The molds were placed in a hydraulic press and heated by band heaters to 155° C. and then subjected to a pressure of 4000 lbs./sq. in. for 5 minutes at that temperature. After being cooled the molds were opened and the rods were removed. They were substantially colorless, and had a Rockwell hardness of M–90. Cylindrical rods molded under the same conditions except at pressures of 2000 lbs./sq. in. and 6000 lbs./sq. in. had a Rockwell hardness of M–88 and M–91, respectively. Similar results are obtained when bis (cyanomethyl) nitrosamine is used as the plasticizer.

In comparison, cylindrical rods molded from unplasticized polyacrylonitrile at 155° C. and 4000 lbs./sq. in. pressure were dark in color, brittle, and had a Rockwell hardness of M–110.

*Example II*

Ninety parts of powdered polyacrylonitrile as in Example I were mixed with 10 parts of methyl-B-cyanoethyl nitrosamine and the mixture was molded as in Example I at 155° C. and 4000 lbs./sq. in. pressure. A clear cylindrical rod having a Rockwell hardness of M–57 was thus obtained. Similar rods obtained at 2000 lbs./sq. in. pressure had a Rockwell hardness of M–68. Other rods obtained by molding the mixture at 180° C. and 4000 lbs./sq. in. pressure had a Rockwell hardness of M–67.

Similar results are obtained when ethyl-B-cyanoethyl nitrosamine is used as the plasticizer.

*Example III*

An intimate mixture of 75 parts of polyacrylonitrile and 25 parts of methyl-B-cyanoethyl nitrosamine was moulded as in Example I at 155° C., and 4000 lbs./sq. in. pressure. Clear, rubber-like cylindrical rods having a Rockwell hardness of M–6 were obtained.

*Example IV*

Ninety parts of a powdered copolymer of 99% by weight acrylonitrile and 1% by weight vinyl acetate and having a specific viscosity of $N_{sp}$ 0.25 were mixed with 10 parts of dimethylnitrosamine and the mixture was molded as in Example I, at 110° C. and 4000 lbs./sq. in. pressure. Clear cylindrical rods having a Rockwell hardness of M–71 were obtained. The Rockwell hardness of cylindrical rods obtained by molding the mixture of the copolymer and 10% of dimethylnitrosamine at varying temperatures and pressures is shown in the following table:

| Molding Temperature, °C. | Pressure, p. s. i. | Rockwell M Scale |
| --- | --- | --- |
| 90 | 4,000 | M–79 |
| 100 | 4,000 | M–65 |
| 125 | 4,000 | M–69 |
| 155 | 2,000 | M–53 |
| 155 | 4,000 | M–55 |
| 155 | 6,000 | M–58 |
| 180 | 4,000 | M–91 |

Cylindrical rods obtained by molding a mixture of 80 parts of the copolymer and 20 parts of dimethylnitrosamine at 155° C. and 4000 lbs./sq. in. pressure exhibited a rubber-like elasticity.

Cylindrical rods obtained by molding mixtures of the copolymer and diethyl or dipropylnitrosamine have similar properties.

*Example V*

Ninety parts of a powdered acrylonitrile-vinyl acetate copolymer as in Example III were mixed with 10 parts of nitrosopiperidine and the mixture was molded as in Example I, at 180° C. and 4000 lbs./sq. in. pressure. The substantially colorless cylindrical rods obtained had a Rockwell hardness of M–87.

The nitrosopiperidine may be replaced by other heterocyclic nitrosamines, such as nitrosomorpholine and nitrosopyrrolidine, for similar results.

*Example VI*

Nine parts of a powdered acrylonitrile-vinyl acetate copolymer as in Example III, and one part of dimethylnitrosamine were dissolved in 90 parts of dimethylacetamide. A sheet of kraft paper was passed through the solution, and air-dried. The dried sheet carried a film of the plasticized copolymer and the adhesion of the film to the sheet was surprisingly strong in view of the weak bond which usually exists between a synthetic resin film and a paper base. The plasticized copolymer film could be stripped off the paper base without crumbling.

In contrast, when a sheet of the same paper was passed through a solution obtained by dissolving 10 parts of the unplasticized copolymer in 90 parts of dimethylacetamide and air-dried, the copolymer film cracked when the paper was bent and crumbled when it was attempted to strip it off the base. The cracking and crumbling were due to the extreme brittleness of the film.

*Example VII*

A solution was prepared by dissolving 1.8 parts of the acrylonitrile-vinyl acetate copolymer of Example III, and 0.2 part of nitrosopiperidine in 98 parts of dimethylacetamide. A sheet of cellophane was passed through the solution and then air-dried.

The adhesion of the plasticized copolymer film or coating to the cellophane base was excellent and comparable to that usually obtained when a synthetic resin is applied to a cellophane base pre-treated with a special anchoring agent for the resin.

Instead of mixing the nitrosamines with the polyacrylonitrile or specific acrylonitrile-vinyl acetate copolymer set forth in the examples for the purpose of illustrating the invention, they may be used to plasticize any polyacrylonitrile having a molecular weight in the fiber or film-forming range, binary and ternary copolymers containing at least 85%, e. g., 85 to 98% by weight acrylonitrile in the polymer molecule, or blends of acrylonitrile polymers having an overall polymerized acrylonitrile content of not less than 85% by weight.

The invention provides compositions for producing tough, flexible chemically resistant molded articles which can be machined without rupture. Such articles are superior to the brittle, readily fractured articles obtained by molding the unplasticized polymers.

It is to be understood that changes and variations may be made herein without departing from the spirit and scope of the invention as defined by the appended claims.

We claim:

1. A composition consisting essentially of a finely divided moldable mixture comprising finely divided particles of polyacrylonitrile and bis (B-cyanoethyl) nitrosamine in an amount of about 10% of the combined weight of the polyacrylonitrile and nitrosamine.

2. Sheet material comprising a hydrophilic cellulosic material having firmly adhered to a surface thereof a composition comprising (1) a polymeric material containing at least 85% by weight of polymerized acrylonitrile and from 10% to 25% of the weight of the composition of bis B-cyanoethyl nitrosamine.

3. A composite sheet material as in claim 2 in which the base is paper.

4. A composite sheet material as in claim 2 in which the base is a regenerated cellulose film.

References Cited in the file of this patent

UNITED STATES PATENTS 2,404,713    Houtz _____ July 23, 1946

FOREIGN PATENTS 905,695    France _____ Apr. 23, 1945